United States Patent [19]
Yoshikawa et al.

[11] Patent Number: 4,644,239
[45] Date of Patent: Feb. 17, 1987

[54] MOTOR ACTUATOR WITH CONTROL MEANS RESPONSIVE TO INTERNAL AND EXTERNAL CONDITIONS

[75] Inventors: Shinichi Yoshikawa; Shigeru Nishiwaki; Toshiro Shimodaira, all of Nagano, Japan

[73] Assignee: Kabushiki Kaisha Sankyo Seiki Seisakusho, Japan

[21] Appl. No.: 742,482

[22] Filed: Jun. 7, 1985

[30] Foreign Application Priority Data

| Jun. 7, 1984 | [JP] | Japan | 59-85125[U] |
| Jun. 7, 1984 | [JP] | Japan | 59-85126[U] |
| Jul. 5, 1984 | [JP] | Japan | 59-101828[U] |
| Jul. 16, 1984 | [JP] | Japan | 59-106427[U] |
| Jul. 31, 1984 | [JP] | Japan | 59-160726 |
| Dec. 14, 1984 | [JP] | Japan | 59-188899[U] |

[51] Int. Cl.$^4$ .............................................. G05D 23/00
[52] U.S. Cl. ...................................... 318/641; 318/678
[58] Field of Search ............................... 318/641, 678

[56] References Cited
U.S. PATENT DOCUMENTS
4,070,610  1/1978  Rudich ............................... 318/678

Primary Examiner—William M. Shoop, Jr.
Assistant Examiner—Saul M. Bergmann
Attorney, Agent, or Firm—Sughrue, Mion, Zinn, Macpeak, and Seas

[57] ABSTRACT

A motor actuator, responsive to conditions such as temperature, and to the position of a mechanism which the motor moves during operation, such as a damper which separates a refrigerating chamber from a cold storage area. The motor actuator is a capable of controlling the operation of more than one mechanism from a single motor, and can operate one or more mechanisms simultaneously (with or without a predetermined delay,) or with a relative predetermined delay.

12 Claims, 29 Drawing Figures

MOTOR ACTUATOR WITH CONTROL MEANS RESPONSIVE TO INTERNAL AND EXTERNAL CONDITIONS

BACKGROUND OF THE INVENTION

This invention concerns a motor actuator that controls the position of a motor-driven member depending on conditions such as temperature.

In a cold storage area having a refrigerating chamber and a cold chamber separated from each other, for example, cold air in the refrigerating chamber is supplied to the inside of the cold chamber. The cold air supply is controlled by the opening and closing of a damper positioned in a passage connecting the refrigerating chamber with the cold chamber. A motor actuator is used to open and close the damper.

While the motor actuator turns on and off depending on the temperature in the cold chamber, the motor actuator can malfunction if the setting temperature for the cold chamber changes during operation. Accordingly, a stable control function is required to accommodate changes in the external conditions during operation. Further, in order to realize such a function, it is necessary that the open and closed states of the damper also be used as inputs.

Accordingly, it is an object of this invention to provide a motor actuator that prevents malfunction by employing, as an input condition, the position of the driven member, such as a damper, which is to be controlled, as well as other data, such as temperature.

Another object of this invention is to obtain stable characteristics for a motor actuator by providing an AC motor with a reverse rotation preventive mechanism to prevent possible reverse rotation upon initiation of operation.

A further object of this invention is to enable the opening and closing of a plate, such as a damper, irrespective of the driving position of the motor.

A still further object of this invention is to independently control two driven members such as dampers by a single driving source.

Yet another object of this invention is to eliminate drawbacks in conventional driving means, such as low responsive speed, larger scale of the device and noisy operation, by utilizing a motor as the driving source.

SUMMARY OF THE INVENTION

In view of the above and other objects, in accordance with this invention, the level of a signal related to temperature and the level of a signal related to the opening and closing position of a driven member, such as a louver or the like, are used as the input conditions for the control means, so that the louver or the like can be opened or closed depending on the change in the temperature condition or the like. Positional control can be continued if the setting temperature changes abruptly during such control. The motor is stopped, after the state of a switch has been changed, by delaying a signal from a switch means more than a predetermined period of time. Accordingly, even if the motor temporarily rotates reversely upon subsequent restarting of the motor, the switch neither repeats an unnecessary ON-OFF operation nor has an uncertain state during the reverse rotation. This can prevent malfunction of the control means. Malfunction upon stopping of the motor can be prevented positively by ignoring the stop signal from a switch means (such as a cam and a switch) by more than a predetermined period of time. The ignoring of the stop signal can be achieved by delaying an external motor driving signal in a delay circuit or the like, and allowing the stop signal to pass through a logic element as one condition therefor while using the above-mentioned delay signal as another condition. Accordingly, even when the motor temporarily rotates reversely upon re-starting and the switch repeats an unnecessary ON-OFF operation during the reverse rotation correction period, the control operation has no unstable state, whereby malfunction of the control means may be prevented.

Further, according to another embodiment of the invention, a relatively inexpensive AC motor, for instance, an AC motor with a reverse rotation preventive mechanism, may be employed and the motor can be driven exactly by a predetermined rotational amount by detecting the rotating amount of the motor with a switching means comprising two cams and two switches and combining it with the motor driving external signal as yet another condition.

As an additional feature, the opening and closing plate is resiliently biased with a closing or opening force by a spring and the opening and closing movement is carried out by a motor which drives a cam mechanism.

Furthermore, according to this invention, rotational force of one motor is transmitted by way of gears or a cam mechanism to two driven members, so that the members may be opened and closed in a controlled manner. Further, four operation modes can be set automatically with respect to the two driven members depending on signals from the means for detecting the rotating position of the motor and from two sensors, by using a control circuit.

BRIEF DESCRIPTION OF THE DRAWINGS

Several preferred embodiments of the invention will be described below with reference to the accompanying drawings, in which.

DETAILED DESCRIPTION OF THE PREFERRED EMBODIMENTS

Figure 1:
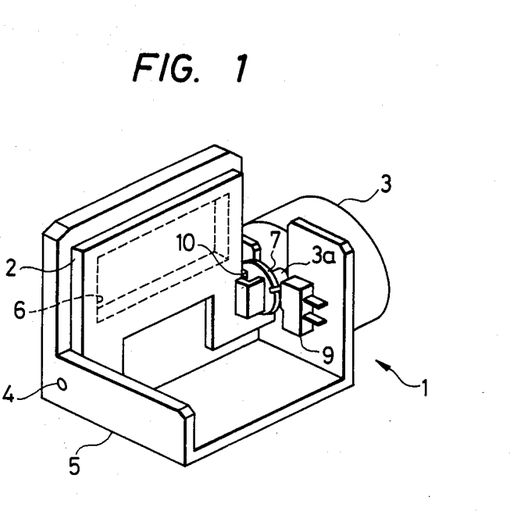
FIG. 1 is one perspective view of the mechanical structure of an apparatus which employs the invention, and also shows several elements of the invention.
Figure 2:
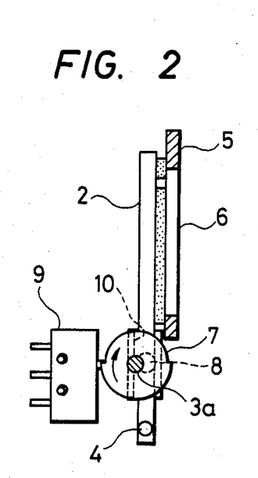
FIG. 2 is a side view of the apparatus of FIG. 1.

One embodiment of the invention is applicable, as an example, to a motor actuator 1 for a cold storage area with a refrigerator cooling box. FIGS. 1 and 2 show the mechanical structural portion of a motor actuator 1. An articulatable object to be controlled, such as the damper 2, is driven by a motor 3 having a speed retarder. The plate-like damper 2 is rotatably supported at a lower end on a support shaft 4 and connected thereby to a frame 5, whereby a discharge port 6 thereof may be opened and closed. The motor 3 is secured on the side of the frame 5 for causing, by a power shaft 3a, a cam 7 and an eccentric pin 8 thereof to rotate. The cam 7 has two semicircular contours of different radii. The contour of the cam face controls the ON-OFF operation of a switch 9. The switch 9 is opened when the damper 2 is closed and closed when the damper 2 is opened. The eccentric pin 8 fits into the side of a groove 10 formed on the side of the damper 2 and transmits the articulating movement thereof to the damper 2 while converting it into a swinging movement for closing and opening.

Figure 3:
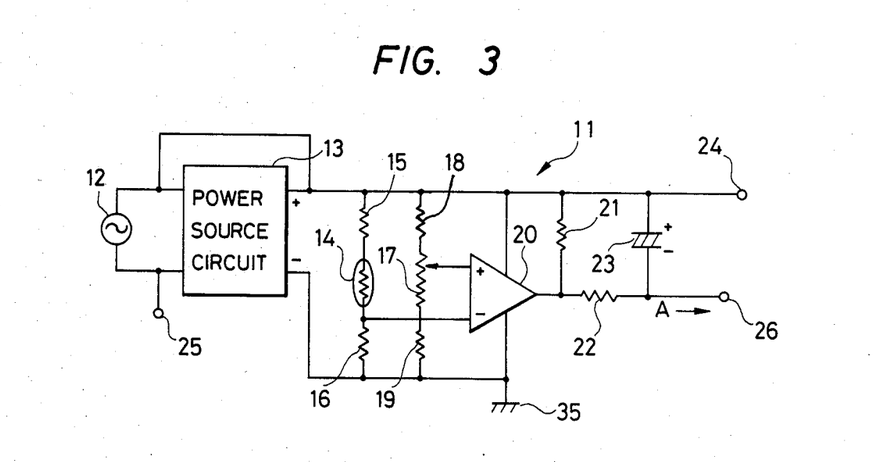
FIG. 3 is a first embodiment of a temperature detector circuit.

FIG. 3 shows a temperature detection circuit 11 as a first means for detecting the temperature inside the cold storage area and generating a drive pre-condition signal A depending on the temperature condition. An AC power source 12 is connected to a power source circuit 13. The output of the power source circuit 13 is connected to a bridge circuit comprising a thermistor 14, a resistor 15, a resistor 16, a variable resistor 17, and resistors 18 and 19, and also to a comparator 20 supplied with the change in the balance voltage of the bridge circuit as the input, resistors 21 and 22, and a capacitor 23 successively. One end of the capacitor 23 and one end of the AC power source 12 form power source terminals 24 and 25 respectively, and the other end of the capacitor 23 which is connected to the output of the comparator 20 forms an output terminal 26 of the drive pre-condition signal A.

Figure 4:
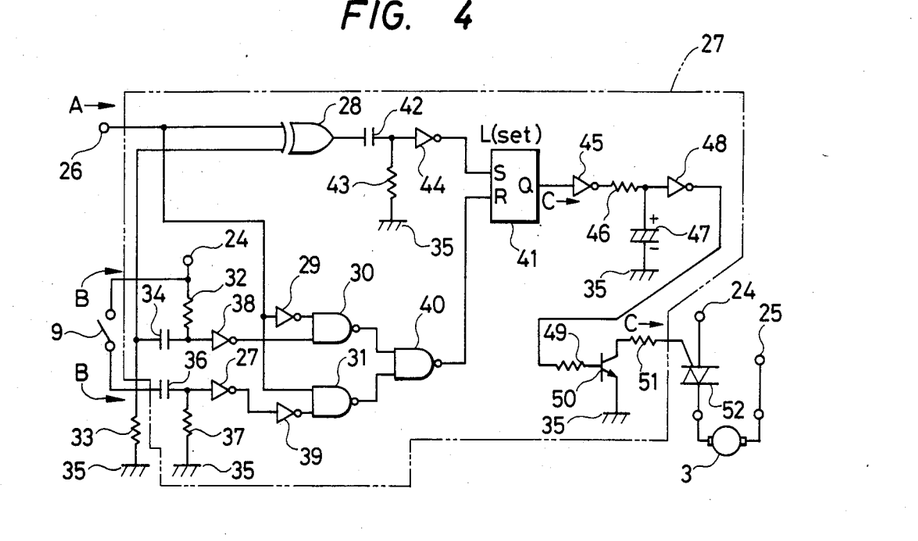
FIG. 4 is a first embodiment of a control circuit which is the motor actuator of the invention.

FIG. 4 shows a control circuit 27 for the motor 3. The output terminal 26 is one input of an EX-OR circuit 28 and also is connected through an inverter 29 to one input terminal of a NAND circuit 30. The terminal 26 also is connected to one input terminal of a NAND circuit 31.

The power source terminal 24 is connected, via resistors 32, 33 and a capacitor 34, to the ground 35, and also is connected, via the switch 9, a capacitor 36 and a resistor 37, to the same ground 35. The switch 9 is a second means which generates a stop pre-condition signal B by its ON-OFF operation. The terminals of the capacitors 34 and 36 on the side of the resistors 32 and 37 are respectively connected, via an inverter 38, to the other input terminal of the NAND circuit 30, and also, via two inverters 27, 39, to the other input terminal of the NAND circuit 31 respectively. The output terminals of the NAND circuits 30 and 31 are connected respectively to the input terminals for the NAND circuit 40, and the output terminal of the NAND circuit 40 is connected to the reset input terminal of a flip-flop 41 as a storage (latch) means.

The output terminal of the EX-OR circuit 28 is connected via a differentiation capacitor 42 and a resistor 43 to the ground 35, and also is connected via an inverter 44 to the set input terminal of the flip-flop 41. The output terminal of the flip-flop 41 is connected to an inverter 45 and one end of a resistor 46. The other end of the resistor 46 is connected to an integrating capacitor 47 and thence to the ground 35, and also is connected via an inverter 48 and a resistor 49 to the base of a switching transistor 50. Here, the capacitor 47 and the resistor 46 constitutes the main part of this invention, forming a delay means 65 with a time constant sufficient to delay the drive signal C by a period of time at least equal to the maximum reverse rotation time for the motor 3.

The transistor 50 has its other two terminals connected together with a resistor 51 between the gate of a triac 52 and the ground 35. The triac 52 is serially connected together with the AC motor 3 between the power source terminals 24 and 25.

Operation of the motor actuator 1 described above will now be explained. The temperature inside the cold storage area can be set by adjusting the resistance value of the variable resistor 17. The voltage derived therefrom is applied to the non-inverting input terminal of the comparator 20.

(1) When the temperature inside the cold storage area rises, the resistance value of the thermistor 14 is decreased to increase the voltage at the inverting input terminal of the comparator 20. When this voltage exceeds the input voltage at one input, the drive pre-condition signal A as the input terminal 26 changes from a "H" level to a "L" level.

In this case, when the articulating member, i.e., the damper 2 is closed, since the input of the switch 9, that is, the stop pre-condition signal B is at the "H" level, a pulse at the "L" level is inputted to the set input terminal of the flip-flop 41. Accordingly, the flip-flop 41 is set and a signal at the "H" level appears at the output terminal thereof. The signal is delayed by an appropriate delay time established by the inverters 45 and 48 and the capacitor 47 and applied to the base of the transistor 50 to render the transistor 50 conductive. Since the triac 52 is thereby rendered conductive, the motor 3 causes the damper 2 to open. When the damper 2 is opened, the output of the switch 9 is reversed, changing from the "H" level to the "L" level, whereby a pulse at the "L" level is outputted to the output terminal of the NAND circuit 40 at the leading edge of the pulse to thereby reset the flip-flop 41. Since both of the transistor 50 and the triac 52 are turned OFF, the motor 3 stops directly.

When the damper 2 is opened at the time the temperature inside the cold storage area rises, since the output of the switch 9 is at the "L" level, no "L" level pulse is inputted to the set input terminal of the flip-flop 41 and the flip-flop 41 is not set. Accordingly, the motor 3 does not rotate and the damper 2 is kept open.

(2) When the temperature inside the cold storage falls, the resistance value of the thermistor 14 is increased and the input voltage at the inverting input of the comparator 20 decreases. When it decreases below the voltage at the non-inverting input terminal, the signal level of the drive pre-condition signal A at the output terminal 26 changes from the "L" level to the "H" level.

In this case, if the damper 2 is opened, since the input from the switch 9, that is, the stop pre-condition signal B is at the "L" level, a "L" level pulse is inputted to the set input terminal of the flip-flop 41, by which the flip-flop 41 is set. In this way, the motor 3 closes the damper 2 as described above. When the damper 2 is closed, the output from the switch 9 is reversed from the "L" to "H" level. Since a "L" level pulse is outputted at the output terminal of the NAND circuit 40 upon detecting the rise of the pulse, the flip-flop 41 is reset. This causes both the transistor 50 and the triac 52 to turn OFF, and the motor 3 stops automatically.

If the damper 2 is closed when the temperature in the cold storage area is falling, since the output from the switch 9 is at the "L" level, no "L" level pulse is inputted to the set input terminal of the flip-flop 41 and, accordingly, the flip-flop 41 is not set. Thus, the motor 3 does not rotate, and the damper 2 remains closed.

(3) Where the temperature inside the cold storage area is kept at a certain level and a setting temperature is lowered by adjusting the variable resistor 17, the voltage at the non-inverting input of the comparator 20 gradually falls. When it falls below the input voltage from the thermistor 14, the output from the comparator 20 changes from the "H" level to the "L" level. If the damper 2 is closed at the time, the damper 2 is then opened as in the previous case (1) when the temperature inside the cold storage area rises, as already described. Alternatively, if the damper 2 is open at the time, it is kept open, since the flip-flop 41 is not set.

(4) Further, where the temperature inside the cold storage is kept at a certain level and the setting temperature is increased by adjusting the variable resistor 17, the input voltage at the non-inverting input of the comparator 20 gradually increases. When it exceeds the input on the side of the thermistor 14, the output of the comparator 20 changes from the "L" level to the "H" level. If the damper 2 is open at the time, the flip-flop 41 is set and the motor 3 closes the damper 2. If the damper 2 is closed, the flip-flop 41 is not set and, accordingly, the damper 2 is kept closed.

In this way, increase or decrease of the temperature inside the cold storage area relative to the set temperature value is detected by the rise or fall of the output from the comparator 20, to control the ON-OFF state of the motor 3. The open or closed position of the damper 2 is converted by the cam 7 and the switch 9 into the stop pre-condition signal B, and the change of the state of the damper 2 from open to closed or from closed to open is detected by the rise or fall of the output from the switch 9 to thereby control the stopping of the motor 3. Whether the stop precondition signal B for the motor 3 is issued upon rise or fall of the output from the switch 9 is determined depending on the present temperature in the cold storage area, which is lower or higher relative to the set value.

Figure 5:
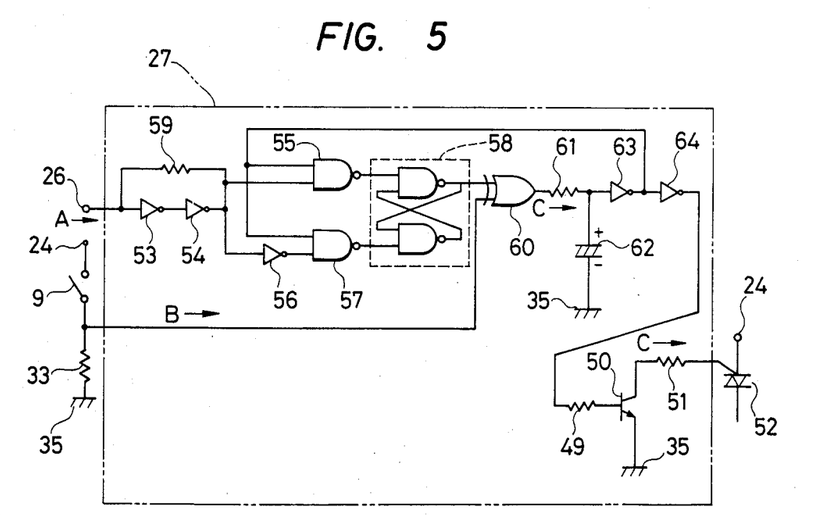
FIGS. 5 and 6 are second and third embodiments of the control circuit.

FIG. 5 shows another embodiment of the control circuit 27. The output terminal 26 of the temperature detection circuit 11 passes through inverters 53 and 54, and then either to one input terminal of a NAND circuit 55 or through an inverter 56 to one input terminal of a NAND circuit 57. The output terminals of the NAND circuits 55 and 57 are connected to the set and reset input terminals of a flip-flop 58, respectively. Also, the output terminal of the inverter 54 is connected through a resistor 59 to the input terminal of the inverter 53. The switch 9 and the resistor 33 are serially connected between the power source terminal 24 and the ground 35. The output terminal of the flip-flop 58 and the junction point between the switch 9 and the resistor 33 are respectively connected to the input terminals of an EX-OR gate 60. The output terminal of the EX-OR gate 60 is connected to one end of a resistor 61. The other end of the resistor 61 is connected via an integrating capacitor 62 to the ground 35, and also is connected via inverters 63 and 64 to the base of a transistor 50 through a resistor 49 in the same manner as in the previous embodiment. The output terminal of the inverter 63 is also connected to the other input terminals of the NAND circuits 55 and 57.

Because the signal level from the switch 9 constitutes only one of the inputs of the EX-OR gate 60, the output of the inverter 63 becomes an input of the flip-flop 58 in accordance with the state of the switch 9 and the set or reset condition of the flip-flop 58, in addition to the output signal from the temperature detection circuit 11 in this embodiment. Quite the same function as described above can also be obtained in this embodiment.

Figure 6:
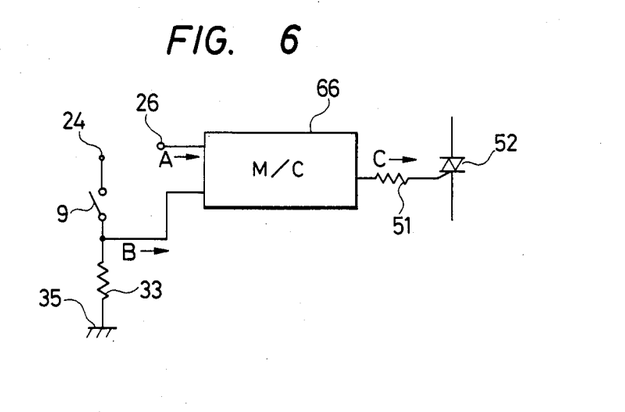

Furthermore, while all of the required conditions are set by logic circuitry in each of the embodiments, these functions also may be performed by a microcomputer 66, as shown in FIG. 6.

Although the switch 9 is opened and closed depending on its connection with the cam 7 in the above-described embodiments, the switch 9 may also be a photoswitch or other similar proximity switch. Further, while there are two driving positions corresponding to the opening and closing operations in the above embodiments, there may be, for example, three possible positions (whole open, half open and whole closed, for example) or more, any number of which may be selected. Further, the object to be controlled by this invention is in no way limited to a cold storage area but, for instance, it may be utilized also as the damper control of a car cooler. Further, the signal used as the driving pre-condition signal A need not be merely the detected temperature but may be the amount of deposited frost, for instance.

Figure 7:
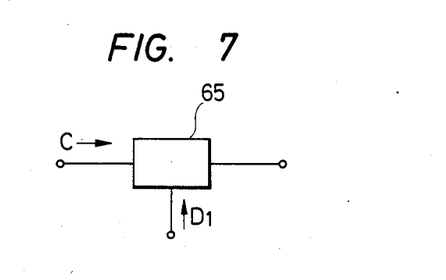
FIGS. 7 and 8 show alternative arrangements for a delay circuit used in the embodiment of FIG. 4.
Figure 8:
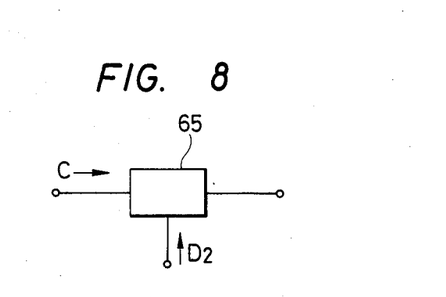

Further, while the delay means 65 is a time constant circuit in the above embodiments, the delay means 65 may be constituted as shown in FIG. 7 or FIG. 8, in which the frequency of a reference oscillation signal D1 (FIG. 7) or AC signal D2 (FIG. 8) is counted by a counter 67 for each output from the flip-flop 41 or the EX-OR circuit 60, that is, the drive signal C is issued when a counted value corresponding to a certain delay time is reached.

Furthermore, while the delay means is disposed at the succeeding stage of the flip-flop 41, 58 is either of the foregoing embodiments, it may be situated on the input side of the flip-flops 41, 58, that is, at the midway of the transmission path of the external signal A and the stop signal B, or only at an appropriate position in the transmission path at least for the stop signal B.

Figure 9:
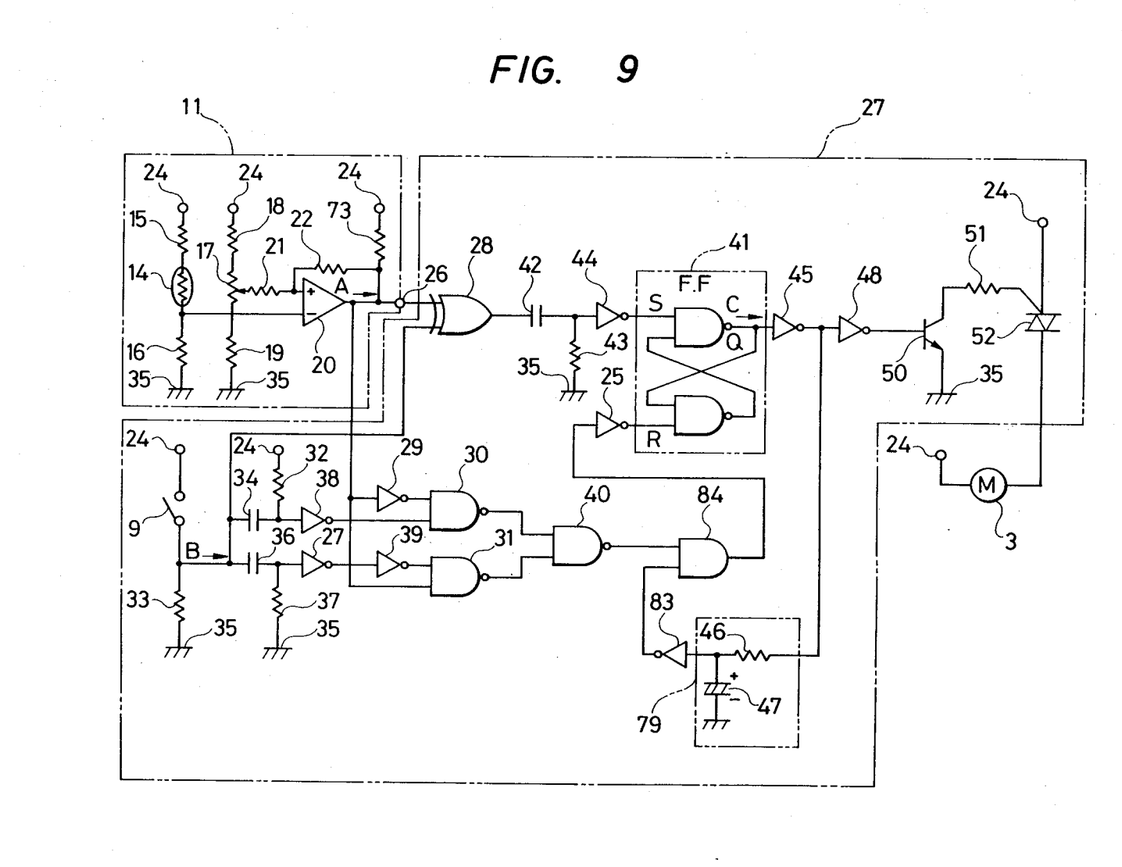
FIG. 9 shows a second embodiment of the temperature detection circuit and a fourth embodiment of the control circuit.

The prevention of malfunction upon initiation of motor operation now will be described. FIG. 9 shows a temperature detection circuit 11 for detecting the temperature inside the cold storage area to generate an external signal A for driving a motor depending on the temperature condition, and a control circuit 27 for controlling the AC motor 3.

A thermistor 14 and a variable resistor 17 of the temperature detection circuit 11 constitute, together with other resistors 15, 16, 18 and 19, a bridge circuit between a power source terminal 24 and the ground 35. A comparator 20 is connected together with other resistors 21, 22 and 73 as shown in the Figure. The output of the comparator 20 constitutes an output terminal 26 for the external signal A.

The output terminal 26 is connected to one input terminal of an EX-OR circuit 28, and also through an inverter 29 to one input terminal of a NAND circuit 30, and directly to one input terminal of a NAND circuit 31 respectively. The power source terminal 24 of the switch means is connected by way of a serially connected switch 9 and a resistor 33 to the ground 35, while one end of the switch 9 on the side of the resistor 33 is connected via a capacitor 36 and a resistor 37 to the same ground 35, and also via a capacitor 34 and a resistor 32 to the power source terminal 24, respectively. The switch 9 generates a stop signal B depending on its state.

The terminals of the capacitors 34 and 36 on the side of the resistors 32 and 37 are connected through an inverter 38 to the other input terminal of the NAND circuit 30, through two inverters 27 and 39 to the other input terminal of the NAND circuit 31, respectively. Further, the other end of the capacitors 34, 36 are connected to the other input terminal of the EX-OR circuit 28.

The output terminals of the NAND circuits 30, 31 are connected to the respective input terminals of a 2-input NAND circuit 40, and the output terminal of the NAND circuit 40 is connected via an AND circuit 83 and an inverter 25 to the reset input terminal of an R-S flip-flop 41 as a storage means.

The output terminal of the EX-OR circuit 28 is connected to one end of a differentiation capacitor 42, the other end of which is connected via a resistor 43 to the ground 35 and also is connected via an inverter 44 to the set input terminal of the flip-flop 41. The output terminal of the flip-flop 41 is connected via inverters 45 and 48 to the base of a switching transistor 50.

Figure 10:
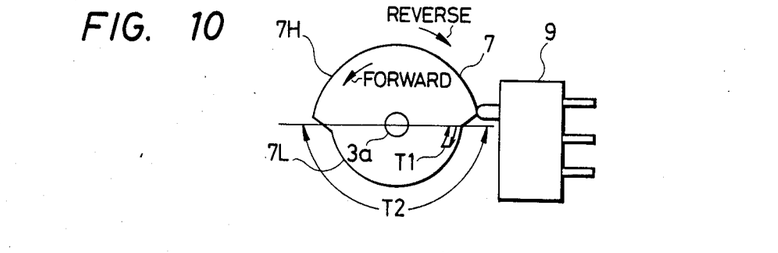
FIG. 10 shows a close-up view of a cam/limit switch combination employed in the invention.

The output of the inverter 45 is also connected via a delay circuit 79 and inverter 83 to one input terminal of the AND circuit 84. The AND circuit 24 and the delay circuit 79 constitutes a main portion of this invention, that is, means including a resistor 46 and an integrating capacitor 47 for delaying the stop signal B for a predetermined period of time T1 after the starting of the AC motor 3. T1 must be longer than the maximum time required for making the AC motor 3 rotate in a forward direction after it has rotated in a reverse manner, and also must be longer than the time period T2 required for changing the state of the switch 9. The relationship is represented by the rotation angle of the cam 7, as shown in FIG. 10.

The transistor 50 is connected together with a resistor 51 between the gate of the triac 52 and the ground 35. The triac 52 is serially connected to the AC motor 3 between a pair of power source terminals 24, 24.

Figure 11:
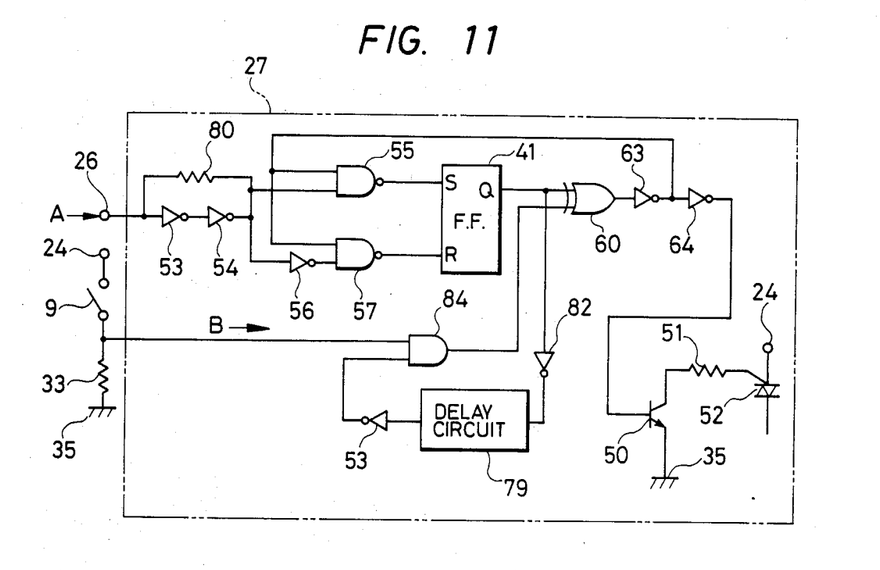
FIGS. 11 and 12 show fifth and sixth embodiments of the control circuit.

FIG. 11 shows another embodiment of the control circuit 27. The output terminal 26 of the temperature detection circuit 11 is connected to serially-connected inverters 53, 54 and thence directly to one input terminal of a NAND circuit 55 and also via an inverter 56 to one of the input terminals for the other NAND circuit 57. The output terminals of the NAND circuits 55 and 57 are respectively connected to the set and reset input terminals of a flip-flop 41. The output terminal of the inverter 54 is also connected via a resistor 80 to the input terminal of the inverter 53. The output terminal of the flip-flop 41 is connected via an inverter 82 to a delay circuit 79 and to an EX-OR gate 60. The junction point between the switch 9 and the resistor 33 is connected via an AND circuit 84 to the other input terminal of the EX-OR gate 60. The output terminal of the EX-OR 60 is connected by way of inverters 63 and 64 to the base of a transistor 50 in the same manner as the previous circuit. The output terminal of the inverter 63 is also connected to the other input terminals of the respective NAND circuits 55 and 57.

In this embodiment, since the level of the stop signal B from the switch 9 constitutes only one of the inputs of the EX-OR gate 60, the input conditions for the flip-flop 41 comprise the output from the inverter 63 determined by the ON-OFF state of the switch 9 and the set or reset state of the flip-flop 41, in addition to the output signal from the temperature detection circuit 11. Quite the same function as described above can be obtained also in this embodiment.

Figure 12:
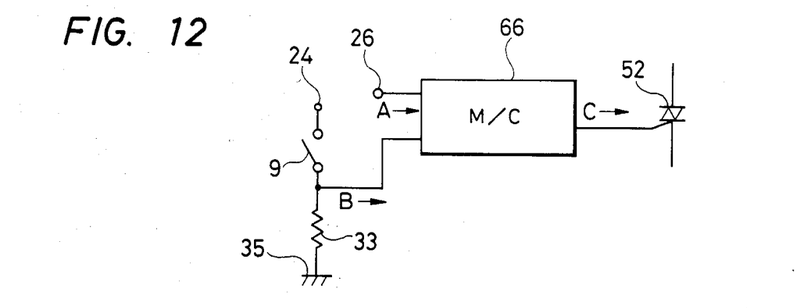

Further, although all of the required conditions are set by logic circuitry in the foregoing embodiment, these functions also may be performed by a microcomputer 66, as shown FIG. 12. In this case, the certain period of time T1 is set by a program inside the microcomputer 66.

Figure 13:
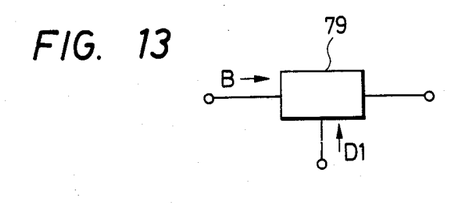
FIG. 13 shows an alternative arrangement for a delay circuit used in the embodiment of FIG. 11.

Furthermore, although the delay circuit 79 is a time constant circuit in the above-described embodiment, the delay circuit 79 may be constituted as shown in FIG. 13, in which the frequency of a reference oscillation signal D1 is counted from the time the stop signal is inputted, the stop signal B being issued when a counted value corresponding to the certain period of time T1 has been reached.

Figure 14:
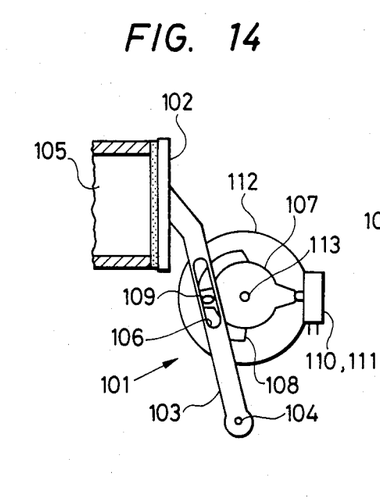
FIG. 14 shows a cam/limit switch arrangement and its positioning with respect to a damper whose control constitutes one application of the invention.

An embodiment which prevents malfunction by utilizing two switches and two cams now will be described. FIG. 14 shows an object, such as a damper 102, which is controlled by a motor actuator 101. The damper 102 is rotatably supported at the top end of an arm 103 to a fixed shaft 104 and faces the opening of a cold air passage 105 so that the opening may be exposed. An elongate hole 106 is formed in a central portion of the arm 103. A pin 109 on either one of the cams 107 and 108 loosely fits into the hole.

The cams 107 and 108, together with corresponding limit switches 110 and 111, constitute respective first and second switch means. The cams 107 and 108 are secured to the output shaft 113 of a one way rotational type AC motor 112.

Figures 15, 16:
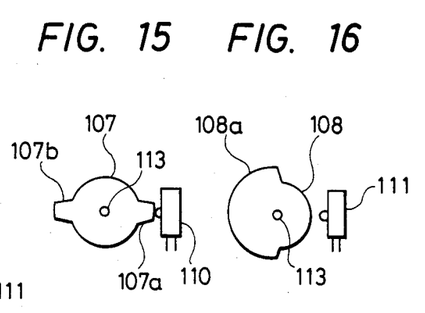
FIGS. 15 and 16 show alternative cam/limit switch arrangements.

The cam 107 has two diametrically opposed projections 107a and 107b, as shown in FIG. 15. When either of the projections contacts the corresponding limit switch 110, the switch 110 is closed. The other cam 108 has a semicircular projection 108a, as shown in FIG. 16.

When the projection 108a contacts the limit switch 111, the limit switch 111 is closed.

Figure 17:
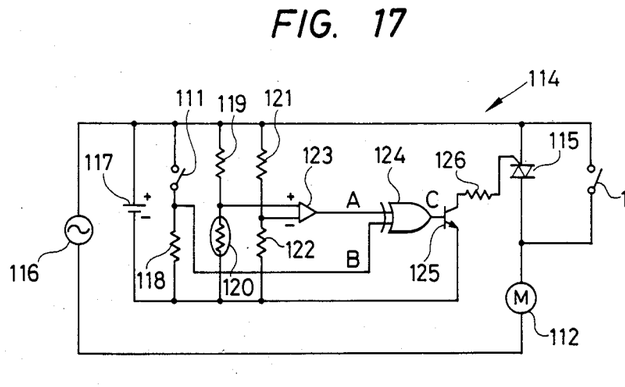
FIGS. 17 and 18 show alternative arrangements of a temperature detection/control circuit combination to be used with the cam/limit switch combinations of FIGS. 14-16.

FIG. 17 shows a control circuit 114. The AC motor 112 is serially connected together with a triac 115 to an AC power source 116. The limit switch 110 is connected in parallel with the triac 115. The control circuit 114 uses one of the electrical paths in common, in which a serial connection of the limit switch 111 and a resistor 118, a serial connection of a resistor 119 and a thermistor 120 and a serial connection of a variable resistor 121 and a resistor 122 are connected respectively in parallel with a DC power source 117.

The resistor 119 and 122, the thermistor 120 and the variable resistor 121 constitute a bridge circuit, the output points of which are connected to the respective input terminals of a comparator 123. The output terminal of a comparator 123 and a junction point between the limit switch 111 and the resistor 118 are connected respectively to the input terminals of an EX-OR gate 124 as a signal generation means. The output terminal of the EX-OR gate 124 is connected to the base of a switching transistor 125, which is serially connected through a resistor 126 between the gate of the triac 115 and the negative side of the DC power source 117.

The operation of the motor actuator 101 will now be described. As already described above, the limit switch 110 is closed when in contact with the projections 107a, 107b and is open otherwise. Accordingly, the AC motor 112 rotates in a self-hold state irrespective of the output signal from the control circuit 114 when the projections 107a, 107b are not in contact with the limit switch 110. The limit switch 111, when in contact with the projection 108a, supplies a signal at a "H" level to one of the inputs of the EX-OR gate 124.

The comparator 123 detects the level of the temperature, that is, the change in the resistance value of the thermistor 120 with respect to the voltage which is divided by the variable resistor 121 and the resistor 122, which is a reference value, and generates a motor driving external signal A. The signal A is a "L" level signal when the temperature is higher and is a "H" level signal when the temperature is lower.

For opening the damper 102 when the temperature is higher and the motor driving external signal A is at the "L" level, the pin 109 is at the position on the left in FIG. 14. Since the limit switch 111 is closed in this case, the signal B from the limit switch 111 is at the "H" level. Since the motor driving external signal A is at the "L" level and the signal from the limit switch 111 is at the "H" level, the EX-OR gate 124 issues a "H" level signal as the drive instruction signal C. Accordingly, the transistor 125 and the triac 115 are rendered conductive, whereby the AC motor 112 starts to rotate, and the damper 102 is opened.

Then, when the limit switch 110 is opened, a current is supplied to the AC motor 112. Since the limit switch 111 is pushed to the midway to open the contact, the signal B from the limit switch 111 becomes "L" level. In this way, since the output from the comparator 123 is at the "L" level and the signal from the limit switch 111 is also at the "L" level, the AC motor 112 rotates in the self-hold state since the limit switch 111 is still kept open, although the triac 115 is turned OFF.

Then, when the projection 107b is in contact with the limit switch 110, since the limit switch 110 is closed, the AC motor 112 is stopped for the first time at this point. The situation is the same in a case where the output from the comparator 123 is at the "H" level.

In the above-described operation, when the output signal from the comparator 123 changes from the "L" level to the "H" level during rotation of the AC motor 112, the cams 107, 108 rotate by 360 degrees and stop at the state shown in FIG. 14 without stopping at a midway point.

Figure 18:
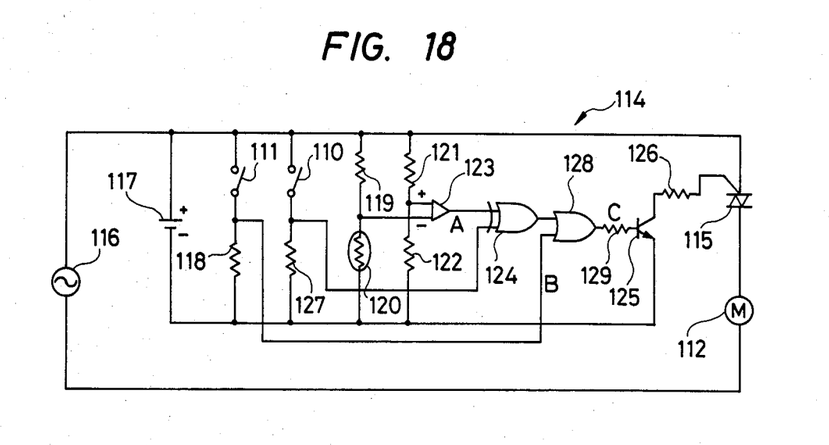

FIG. 18 shows another embodiment in which the AC motor 112 is controlled only by the ON-OFF state of the triac 115. In this embodiment, the limit switch 110 is connected in series with a resistor 127 and the junction point therebetween is connected to one of the input terminals of an EX-OR gate 124. One input terminal of an OR gate 128 is connected to the output terminal of an EX-OR gate 124, and the other input terminal is connected to a junction point between limit switch 111 and resistor 118. The output terminal of the OR gate 128 is connected via a resistor 129 to the base of a transistor 125.

When the limit switch 110 is open, a "H" level output is always obtained by the function of the OR gate 128 to provide a self-hold state. Other operations are the same as in FIG. 17.

Figure 19:
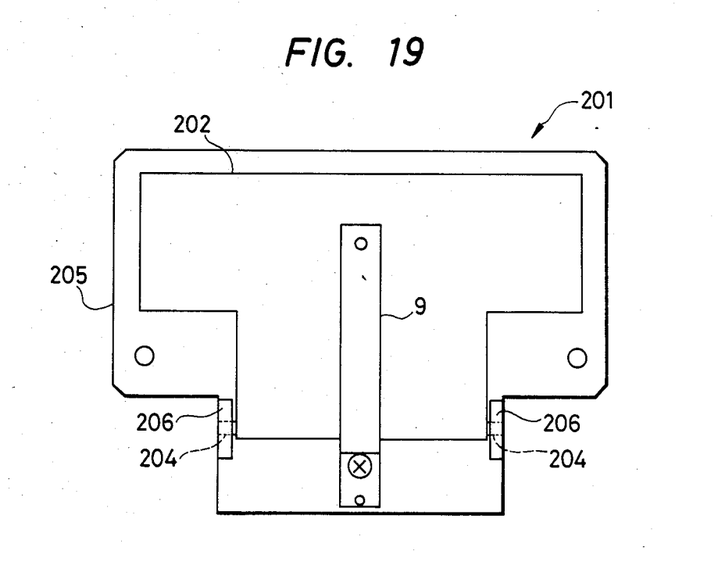
FIGS. 19 and 20 are different views showing different elements of an alternative damper arrangement to which the present invention may be applied.
Figure 20:
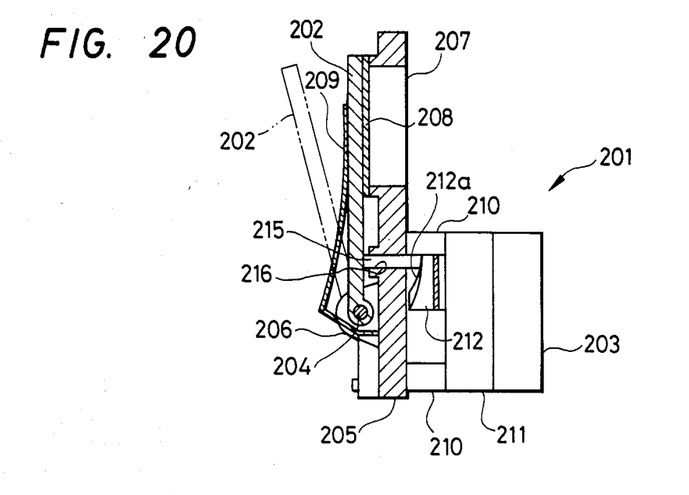

An embodiment with a further improved structure of the motor actuator now will be described. A motor actuator 201 in this embodiment comprises, as shown in FIGS. 19 and 20, a closing and opening plate 202 as an articulating member and a motor 203 as a drive source therefor. The opening and closing plate 202 is rotatably supported by shafts 204 disposed on both ends therebelow on a shaft bearing bracket 206 of a substrate 205. The opening and closing plate 202 has a packing member 208 situated at a position corresponding to and slightly larger than an opening 207. The plate 202 is resiliently biased by a leaf spring 209 secured to the substrate 205 in the direction of contacting the substrate 205, that is, in the direction of keeping the opening 207 closed.

Figure 23:
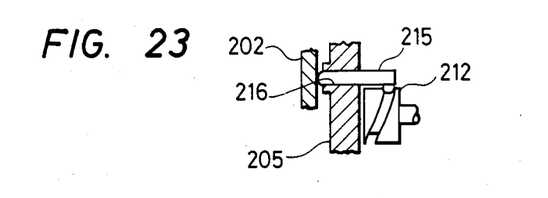
FIG. 23 shows a more detailed view of the cam arrangement of FIG. 20.

The motor 203 is secured together with a gear box 211 to a mounting block 210 formed at the back of the substrate 205. The gear box 212, which transmits decelerated rotation of the motor 203 to a cam 212, contains a switch cam 213 and a switch 214, as shown in FIG. 23.

Figure 21:
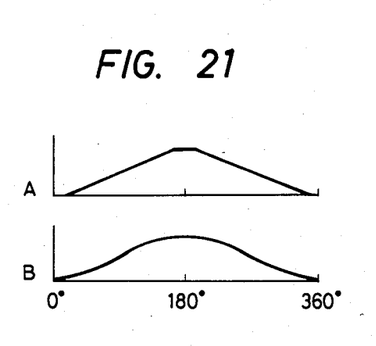
FIG. 21 shows alternative contours of the end face of the cam shown in FIG. 20.

The cam 212 is an end face cam and has a cam end face 212a. The end face 212a has a convex shape, as shown in FIG. 21A. More specifically, the cam end face 212a has a smoothly curved shape, as shown in FIG. 21B.

A follower pin 215 of the cam 212 is maintained axially slidably in a holding hole 216 in the substrate 205 while contacting at one end thereof the cam face 212a and, at the other end, the rear face of the opening and closing plate 202.

Figure 22:
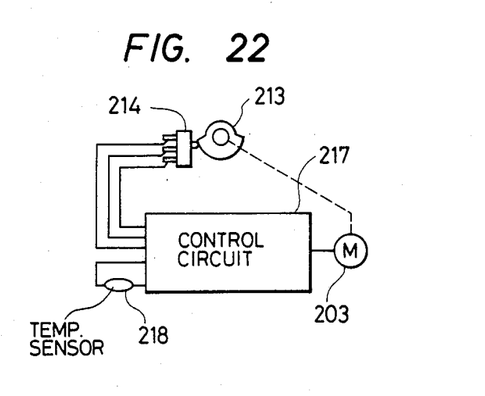
FIG. 22 shows an overall schematic arrangement wherein a motor is controlled in accordance with an output of a temperature sensor and a position of a limit switch.

As shown in FIG. 22, the motor 203 is adapted to be controlled by a control circuit 217. The control circuit 217 automatically controls the ON-OFF state of the motor 203 while using the position of the opening and closing plate 202, that is, the position of the switch 214 and the level change in the signal from a temperature sensor 218 as the input conditions.

The operation of the motor actuator 202 now will be described. When the temperature inside the cold storage rises and the opening and closing plate 202 closes the opening 207, the control circuit 217 starts the motor 203 by a signal from the temperature sensor 218 to rotate the cam 212 by 180 degrees. In this case, the follower pin 215 moves leftwardly in FIG. 20 in accordance with the slope of the cam end face 212 to push the opening and closing plate 202 against the resiliency of the spring 209, thereby exposing the opening 207. Meanwhile, since the switch cam 213 rotates to turn over the switch 214, the control circuit 217 causes the opening and closing plate 202 to open and automatically stop there. In this way, cold air from a refrigerator is supplied through the opening 207 to the inside of the cold storage area.

Then, when the temperature inside the cold storage falls below a predetermined temperature, the control circuit 217 rotates the motor 203 again while receiving the signal from the temperature sensor 218 as an input and confirming the open state of the opening and closing plate 202 by the state of the switch 214. In the 180 degree rotation of the cam 212, the follower pin 215 moves rightwardly in FIG. 20, and the opening and closing plate 202 forces the packing 208 against the opening 207, thereby closing the opening 207 by the resiliency of the spring 209.

While the opening and closing plate 202 is biased by the spring 209 to be closed in the above embodiment, the spring 209 may alternatively bias the opening and closing plate 202 to be open. In this case, the cam 212 and the follower pin 215 drive the opening and closing plate 202 to close the opening 207. Further, the spring 209 need not be a leaf spring, but may be a torsion spring or coil spring connected to the shaft 204. Furthermore, the cam 212 may be a cylindrical cam as shown in FIG. 23, a portion of a follower pin 215 engaging the groove therein.

Although the motor actuator 201 is intended to be incorporated into a cold storage area, it can also be applied to a cooling and warming apparatus or a blowing apparatus in the same manner as shown in FIGS. 1 and 2.

Figure 24:
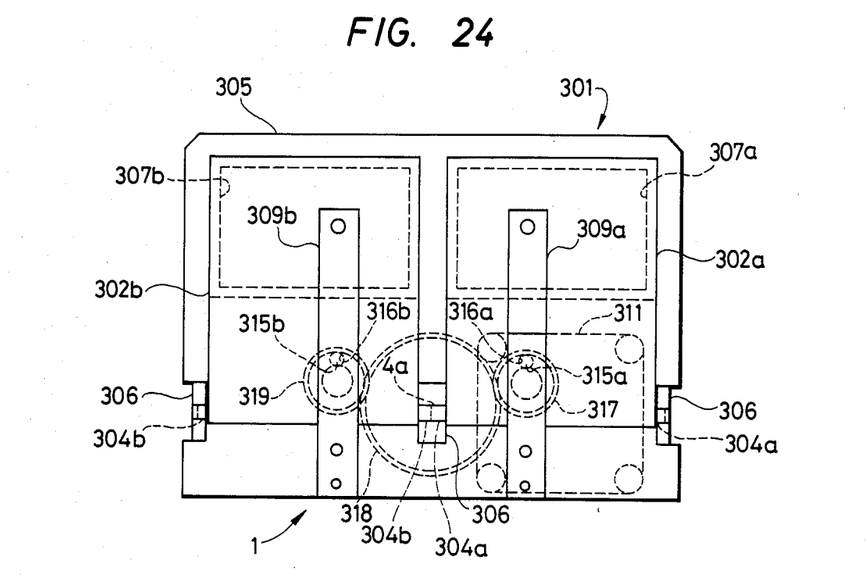
FIG. 24 shows yet another alternative damper arrangement.
Figure 25:
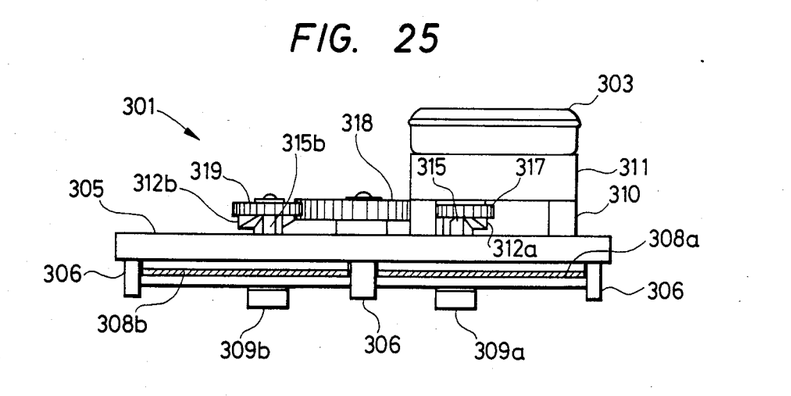
FIG. 25 shows a side view of a camming/gear configuration for operating the dampers in FIG. 24.
Figure 26:
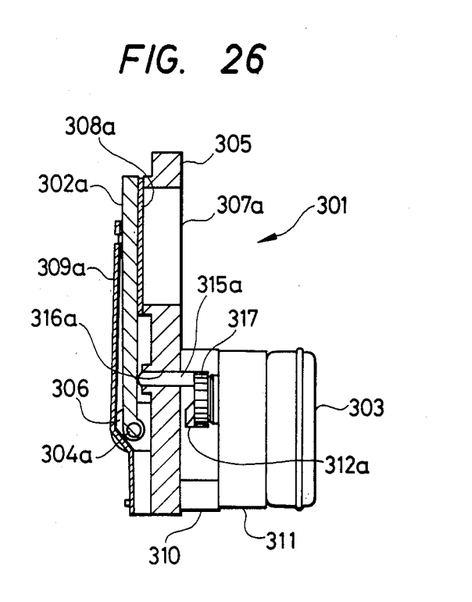
FIG. 26 shows a different side view of the arrangement of FIG. 25.

Now, an embodiment in which two improved structures are disposed in parallel will be described. The motor actuator 301 according to this embodiment comprises opening and closing plates 302a, 302b, as first and second driven members and a common motor 303 as a driving source therefor as shown in FIGS. 24 through 26. The opening and closing plates 302a and 302b are rotatably supported by shafts 304a and 304b disposed at both of the lower ends and three shaft bearing brackets 306 integrally attached to the substrate 305. The respective opening and closing plates 302a, 302b have packings 308a, 308b, at the positions corresponding to and slightly larger than the openings 307a, 307b, formed in the substrate 305, and are biased by leaf springs 309a and 309b secured to the substrate 305 to close the respective openings 307a, 307b.

Figure 27:
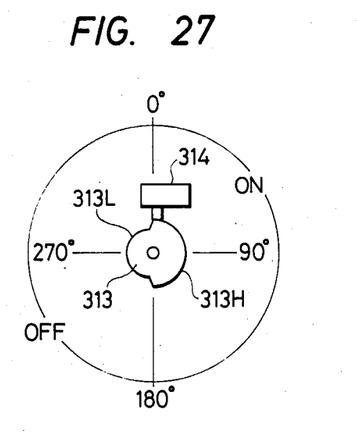
FIGS. 27 and 28 show the different angular positions of the cam/limit switch combinations used in the embodiment of FIGS. 24-26, and corresponding operational modes.

The motor 303 is secured together with a gear box 311 to a mounting block 310 formed at the back of the substrate 305. The gear box 311 transmits a decelerated rotation of the motor 303 to each of the cams 312a, 312b and also drives a switch cam 313 incorporated therein. As shown in FIG. 27, the switch cam 313, together with a switch 314, constitutes a position detection means. The switch cam 313 has a semicircular projection 313H and a lower semicircular portion 313L, and corresponds to the operation modes 1, 2, 3, and 4 every 90 degrees, as shown in FIG. 28.

Figure 28:
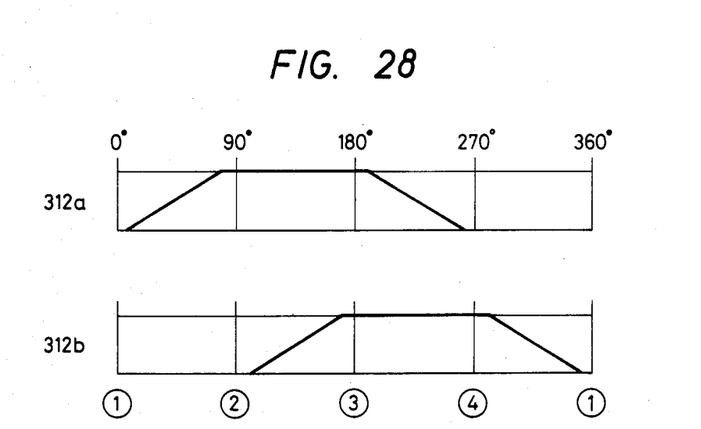

The respective cams 312a and 312b are each an end face cam and, as also shown in FIG. 28, have trapezoidal cam curves with a 90 degree difference in rotation angle. Follower pins 315a, 315b are maintained axially slidably in the holding holes 316a, 316b of the substrate 305, while being in contact at one end thereof with the cam faces of the cams 312a, 312b and at the other end thereof with the rear faces of the opening and closing plates 302a, 302b. The rotation of the cam 312a is transmitted to gear 317 integrally connected thereto, an idle gear 318, and a gear 319, which is integral with the cam 312b, and which rotates in the same direction and at the same rate.

Figure 29:
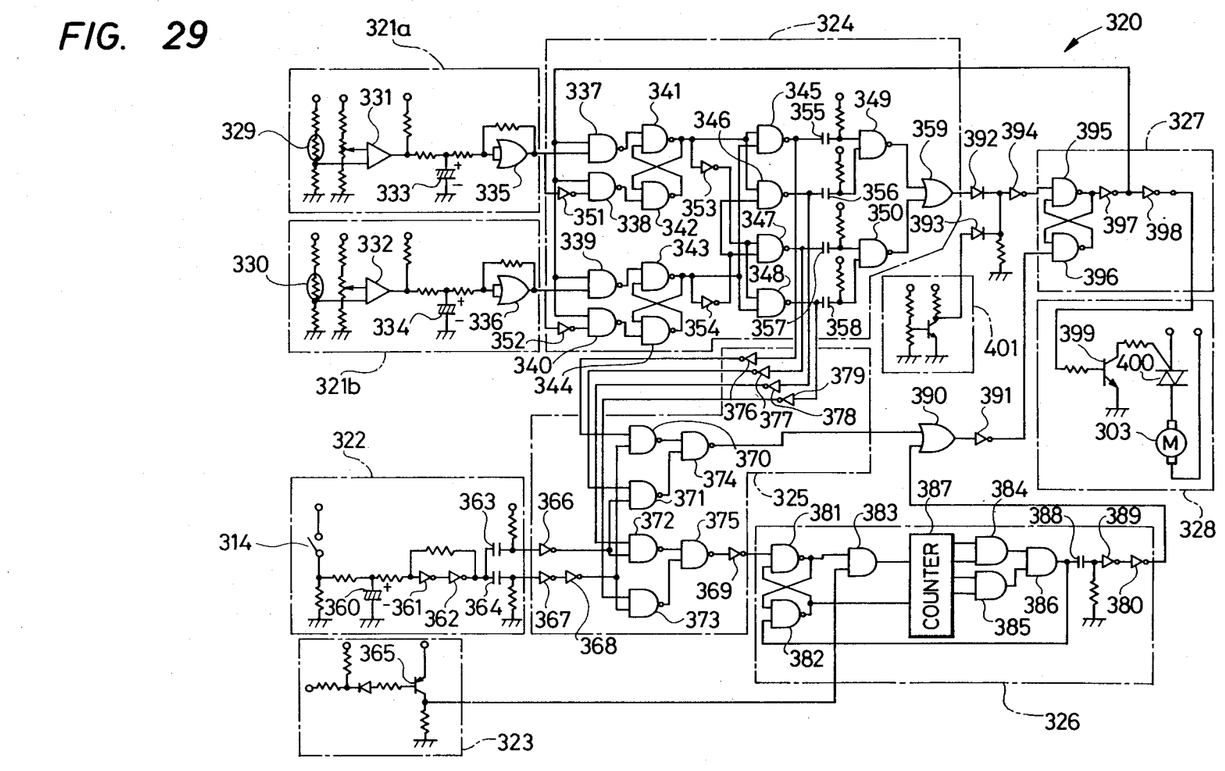
FIG. 29 shows an overall control circuit for operating a motor used with the damper configuration of FIG. 24.

FIG. 29 shows a control circuit 320 for controlling the start and stop and the amount of rotation of the motor 303. The control circuit 320 comprises temperature detection circuits 321a, 321b, a switch circuit 322, a clock output circuit 323, logic circuits 324 and 325, a delay circuit 326, a storage circuit 327 and a drive circuit 328.

Each of the temperature detection circuits 321a, 321b serves to detect the temperature in the cold storage chamber controlled by the respective opening and closing plates 302a, 302b. The circuits respectively comprise resistor bridge circuits including thermistors 329, 330 as the first and second sensors 330, comparators 331, 332, integrating capacitors 333, 334 and OR gates 335, 336.

The logic circuit 324 judges the starting condition of the motor 303 depending on the conditions of the output signal from the temperature detection circuits 321a, 321b and comprises NAND gates 337–350, inverters 351–354, capacitors 355–358 and an OR gate 359 or the like in combination.

The switch circuit 322 generates the signal of the switch 314 as a position detection means, and comprises an integrating capacitor 360, waveform-shaping inverters 361, 362 and differentiation capacitors 363, 364 connected to the power source and to ground, respectively. Further, the clock output circuit 323 outputs a clock signal for setting a delay time, and comprises a switching transistor 365 and the like.

The logic circuit 325 sets the condition for stopping the motor 303 depending on the outputs from the logic circuit 324 and the switch circuit 322, and comprises inverters 366–369, NAND gates 370–375 and inverters 376–379.

The delay circuit 326 sets a delay time corresponding to a rotation of the switch cam 313 of 90 degrees after the starting of the motor 303, and comprises, in combination, NAND gates 381 and 382, AND gates 383–386, a counter 387, a differentiation capacitor 388, and an inverter 389. The outputs from the logic circuits 325 and a delay circuit 326 are connected via an OR gate 390 and an inverter 391 to the reset input terminal of storage circuit 327.

The output from the logic circuit 327 is connected by way of a diode 392 and an inverter 394 to the set input terminal of the storage circuit 327. The storage circuit 327 comprises two NAND gates 395 and 396 as a flip-flop and inverters 397 and 398. The output of the storage circuit 327 also is an input of each of respective NAND gates 337–340. Further, a manual setting circuit 401 is additionally disposed and connected by way of an OR condition setting diode 393 to the set input terminal of the storage circuit 327. The output of the storage circuit 327 turns the power circuit for the motor 303 ON or OFF by means of a switching transistor 399 and a triac 400 in the drive circuit 328.

The operation of the motor actuator 301 now will be described. The operation modes (1), (2), (3), and (4) respectively correspond to rotation of the switch cam 313 of 90, 180, 270 and 360 degrees. The corresponding positions of the opening and closing plates 302a, 302b are as shown in the Table below:

| Operation Mode | Angle of Rotation | Opening and Closing State | |
|---|---|---|---|
| (1) | 0 (360) | 2a - close | 2b - close |
| (2) | 90 | open | close |
| (3) | 180 | open | open |
| (4) | 270 | close | open |

When the opening and closing plates 302a, 302b are open, cold air is supplied from a refrigerating chamber to, for example, a cold chamber or ice chamber. The temperatures in the respective insides are detected by the temperature detection circuits 321a and 321b.

When the switch cam 313 of the position detection means is at the rotational angle 0 (360) and neither of the chambers requires cooling, "H" level outputs appear from both of the temperature detection circuits 321a and 321b. Accordingly, "L" level outputs appear at the NAND gates 345, 349 and 350, while "H" level outputs appear at the NAND gates 346, 347 and 348 in the logic circuits 324 and, accordingly, the output of the logic circuit 324 is at the "L" level. Therefore, the drive circuit turns OFF the power source circuit for the motor 303. This is operation mode (1), where both of the opening and closing plates 302a and 302b are closed.

If the temperature detection circuit 321a detects a temperature higher than the desired temperature, the motor 303 is automatically started to open the opening and closing plate 302a, thereby supplying cold air to the inside of the chamber. That is, if a "L" level output appears on the output of the temperature detection circuit 321a, since an "H" level output appears at the NAND gate 350 of the logic circuit 324, the storage circuit 327 is set to supply a "H" level output to the drive circuit 328, thereby causing the power source circuit to turn the motor 303 ON. Thus, the motor 303 rotates directly to rotate the cams 312a, 312b to open only the opening and closing plate 302a.

Since the switch 314 is kept ON irrespective of the rotation of the motor 303, the switch circuit 322 outputs an "L" level signal on both of its output terminals. Then, since the NAND gate 327 of the logic circuit 325 issues a "H" level output because of the "L" level input at both of its input terminals and the NAND gate 73 issues a "H" level output by the inputs of different levels at its input terminals, a "H" level signal appears on the output of the inverter 369. Since a "H" level signal appears on the output of the NAND gate 381 and a "H" level signal is supplied to one of the inputs of the AND gates 383, clock signals from the clock output circuit 323 are counted by the counter 387 in the delay circuit 326. When a predetermined period of time, for example, five seconds, elapses, since the output from the delay circuit 326 turns from "L" to "H" level, the storage circuit 327 is thereby reset. As a result, since the output of the storage circuit 327 turns to the "H" level, the driving circuit 328 instantly stops the rotation of the motor 303. In this way, when the rotation angle of the switch cam 313 reaches 90 degrees, the motor 303 automatically stops. This is operation mode (2).

When the other temperature detection circuit 321b detects a higher temperature while the control circuit is in operation mode (2), the logic circuit 324 issues a "H" level output signal to turn the drive circuit 328 ON, thereby starting the motor 303 in the same manner as described above. In this way, both of the opening and closing plates 302a, 302b are opened, thereby initiating operation mode (3). When the rotation angle of the switch cam 313 reaches 180 degrees, a "H" level output signal appears on the output of the differentiation capacitor 363 upon closing of the switch 314 thereby producing a signal for setting the storage circuit 327 to the reset state via NAND gates 370, 371 and 374.

When the temperature detection circuit 321a generates a "H" level signal in this operation mode (3), the operation mode (4) is initiated.

In this way, when the motor 303 is stopped when the switch cam 313 is a rotation angle of 180 or 0 (360) degrees, the logic circuit 325 resets the storage circuit 327 when the switch 314 is opened or closed, thereby stopping the motor 303. Further, when the motor stops when the switch cam is at a rotation angle of 90 or 270 degrees, the delay circuit 326 calculates a certain delay time after the switch 314 has been opened or closed to reset the storage circuit 327 and thereby stop the motor 303 at a predetermined rotation angle. The relative position relationship between the switch 314 and the switch cam 313 is, of course, not restricted only to that of this embodiment; other relations may be used.

Although the operation modes (1), (2), (3), and (4) change successively in this explanation of operation, operation mode (1) may change directly to operation mode (3), skipping operation mode (2). The logic circuit 25 may be modified to enable this skipping.

In order to forcibly drive the motor 303, a set signal is applied from the manual set circuit 401 to the storage circuit 327.

While the motor is stopped by each of the four operation modes in the control circuit 320 of the above-described embodiment by operating the delay means at positions of 90 and 270 degrees with respect to a single switch 314, the rotation angle can be detected every 90 degrees by the use of two pairs of switches 314 and switch cam 313, so that the delay circuit 326 is no longer necessary. Further, the settings for such conditions can be realized by logic arrangements other than that of the control circuit 320. Also, any other two driven members besides the opening and closing plates 302a, 302b may be controlled.

We claim:

1. A motor actuator comprising a motor, articulating means rotatable by rotational operation of said motor, position detecting means for detecting a rotational position of said motor, sensor means for detecting an external condition such as temperature, and control circuit means for operating said motor in accordance with first outputs from said sensor means and said position detecting means, said control circuit means stopping said motor in accordance with second outputs both from said position detecting means and from said sensor means.

2. A motor actuator as defined in claim 1, further comprising first delay means for delaying a motor stop signal for a first predetermined period longer than a maximum reverse rotation time of said motor.

3. A motor actuator as defined in claim 1, further comprising second delay means for ignoring a motor stop signal for a second predetermined period of time after the motor has been started, said predetermined period of time being longer than a maximum reverse rotation time of said motor and shorter than a time required for operation of said position detecting means.

4. A motor actuator as defined in claim 1, wherein said control circuit means comprises a microcomputer.

5. A motor actuator as defined in claim 2, wherein said first delay means comprises an RC circuit.

6. A motor actuator as defined in claim 2, wherein said first delay means comprises counter means for counting pulses in accordance with a reference oscillation signal having a predetermined frequency.

7. A motor actuator as defined in claim 3, wherein said second delay means comprises an RC circuit.

8. A motor actuator as defined in claim 3, wherein said second delay means comprises counter means for counting pulses in accordance with a reference oscillation signal having a predetermined frequency.

9. A motor actuator comprising articulating means capable of opening and closing an opening in a frame, biasing means for resiliently biasing said articulating means, a motor mounted on the rear side of said articulating means, position detecting means for detecting a rotational position of the motor, sensor means for detecting an external condition such as temperature, cam means rotatable by said motor, a reciprocal pin abutted against a cam face of said cam for transmitting the opening and closing movement of said articulating means, and control circuit means for operating said motor in accordance with outputs from said sensor means and said position detecting means, said motor being stopped in accordance with an output of said position detecting means.

10. A motor actuator comprising a motor, at least first and second articulating means rotatable by rotational operation of said motor, position detecting means for detecting a rotational position of said motor, at least first and second sensors for detecting external conditions such as temperature, and control circuit means for causing said first articulating means to articulate in accordance with a signal from said first sensor and for causing said second articulating means to articulate in accordance with a signal from said second sensor, operation of said first and second articulating means being carried out independently, operation of said motor being halted in accordance with a signal from said position detecting means.

11. A motor actuator as defined in claim 9, wherein said biasing means comprises means for biasing said articulating means to seal the frame opening.

12. A motor actuator as defined in claim 9, wherein said biasing means comprises means for biasing said articulating means to uncover the frame opening.

* * * * *